United States Patent Office 2,852,361
Patented Sept. 16, 1958

2,852,361

METHOD OF DEFOLIATING PLANTS WITH ALKYLENEBIS(THIONOCARBAMATES)

Thomas E. Lesslie, St. Albans, W. Va., assignor to Monsanto Chemical Company, St. Louis, Mo., a corporation of Delaware No Drawing. Application February 24, 1954
Serial No. 412,398

2 Claims. (Cl. 71—2.7)

The present invention relates to a method of defoliating plants with a new class of thionocarbamates.

The compounds of the present invention possess the structural formula

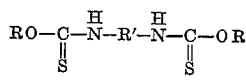

where R represents an alkyl group. Open chain unsaturated radicals are suitable but not cyclic unsaturated groups. Examples of suitable alkyl groups are methyl, ethyl, propyl, isopropyl, butyl, isobutyl, amyl and isoamyl groups. R' represents a divalent open chain radical, as for example ethylene.

The new compounds may be prepared by condensing a bis-xanthogen sulfide or thioanhydride with an alkylene diamine. For example 72 grams of ethyl xanthogen disulfide,

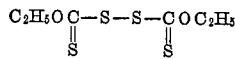

was dissolved in 200 ml. of ether and 18.3 grams of ethylene diamine dissolved in 100 ml. of ether added over a period of about 30 minutes. The by-product was precipitated from the ether solution and removed by filtration. Upon evaporation of the filtrate a good yield of diethyl ethylenebis(thionocarbamate) was obtained. The same compound is obtained by condensing ethyl xanthogen thioanhydride,

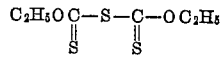

with ethylene diamine. Another method which is perhaps more convenient than either of the foregoing is to treat the condensation product of a xanthate and chloroacetic acid with an alkylene diamine. This method is illustrated in detail below:

Example 1

189 grams or substantially 2 moles of chloroacetic acid was dissolved in enough 20% sodium carbonate solution to give a pH of about 8. This solution was poured over 320.6 grams of substantially 2 moles of potassium ethyl xanthate. An exothermic reaction set in immediately and reaction was effected at 40–50° C. The reaction mixture was then cooled to 20° C. by means of an ice bath and 60.1 grams of ethylene diamine added thereto. The mass was stirred vigorously. After about 15 minutes the reaction mixture was too thick to stir readily so 300 ml. of water was added and stirring continued for about an hour. The product was collected by filtration and dried at 50° C. The yield of diethyl-N,N' - ethylenebis(thionocarbamate) was 139 grams, M. P. 108–110° C. The product contained 11.64% nitrogen and 26.96% sulfur as compared to calculated values of 11.89% nitrogen and 27.13% sulfur. The compound is very soluble in acetone, ethyl acetate and chloroform.

Further examples of the new compounds comprise

Dimethyl-N,N'-ethylenebis(thionocarbamate)
Dibutyl-N,N'-ethylenebis(thionocarbamate)
Dimethyl-N,N'-propylenebis(thionocarbamate)

The new compounds of this invention are valuable defoliants. Applied at the rate of 16 to 24 pounds per acre, diethyl ethylenebis(thionocarbamate) was a very effective defoliant for soya beans. The compounds are also efficient cotton defoliants. Defoliating action is obtained by application in the form of a spray containing 1% or less of the thionocarbamate.

It is intended to cover all changes and modifications of the examples of the invention herein chosen for purposes of disclosure which do not constitute departures from the spirit and scope of the invention.

What is claimed is:

1. A method of defoliating plants which comprises applying thereto in amount sufficient to effect defoliation a composition comprising as the essential active ingredient a compound of the structural formula

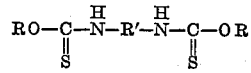

where R is selected from a group consisting of lower alkyl and lower alkenyl groups and R' is ethylene.

2. A method of defoliating plants which comprises applying thereto in amount sufficient to effect defoliation a composition comprising as the essential active ingredient diethyl-N,N'-ethylenebis(thionocarbamate).

References Cited in the file of this patent

UNITED STATES PATENTS

| | | |
|---|---|---|
| 2,225,124 | Martin | Dec. 17, 1940 |
| 2,284,637 | Catlin | June 2, 1942 |
| 2,313,871 | Hanford et al. | Mar. 16, 1943 |
| 2,650,876 | Stewart | Sept. 1, 1953 |
| 2,691,635 | Harris et al. | Oct. 12, 1954 |
| 2,723,989 | Harman | Nov. 15, 1955 |

FOREIGN PATENTS

| | | |
|---|---|---|
| 904,166 | France | Oct. 29, 1945 |
| 599,178 | Great Britain | Mar. 5, 1948 |
| 599,179 | Great Britain | Mar. 5, 1948 |

OTHER REFERENCES

Beilstein: Volume 3, page 128 (1921).
Chem. Abst., vol. 23, column 2953 (1929).
Chem. Abst., vol. 42, column 5858c (1948).